United States Patent
Motta et al.

(10) Patent No.: US 12,012,934 B2
(45) Date of Patent: Jun. 18, 2024

(54) SYSTEM AND METHOD FOR CONTROLLING BLADE PITCH ON WIND TURBINE ROTOR BLADES TO REDUCE VIBRATIONS AND LIMIT LOADS IN A LOCKED CONDITION OF THE TURBINE ROTOR

(71) Applicant: General Electric Renovables Espana, S.L., Barcelona (ES)

(72) Inventors: Valentina Motta, Berlin (DE); Darren John Danielsen, Simpsonville, SC (US); Marianne Luise Susanne Hartung, Munich (DE); Martin Stettner, Munich (DE); Nikolai N. Pastouchenko, Latham, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/544,989

(22) Filed: Dec. 8, 2021

(65) Prior Publication Data
US 2023/0175487 A1    Jun. 8, 2023

(51) Int. Cl.
*F03D 7/02* (2006.01)
*F03D 7/04* (2006.01)
*F03D 17/00* (2016.01)

(52) U.S. Cl.
CPC ......... *F03D 7/0296* (2013.01); *F03D 7/0224* (2013.01); *F03D 7/0298* (2023.08);
(Continued)

(58) Field of Classification Search
CPC ...... F03D 7/0296; F03D 17/00; F03D 7/0224; F03D 7/024; F03D 7/026; F03D 7/045;
(Continued)

(56) References Cited

U.S. PATENT DOCUMENTS

| 9,605,558 B2 | 3/2017 | Perley et al. |
| 2010/0301605 A1 | 12/2010 | Nielsen et al. |

(Continued)

FOREIGN PATENT DOCUMENTS

EP    3859144 A1    8/2021

OTHER PUBLICATIONS

The EP Search Report for EP application No. 22211731.9, May 3, 2023, 7 pages.

*Primary Examiner* — Christopher Verdier
(74) *Attorney, Agent, or Firm* — Dority & Manning, P.A.

(57) ABSTRACT

A proactive method and related wind turbine system are provided for reducing vibrations in the rotor blades when the rotor hub is locked against rotation. The method includes determining an initial blade orientation to wind direction and wind parameters for wind impacting the rotor blades. Based on the wind parameters and blade orientation, an angle of attack is determined for the rotor blades that will at least reduce vibrations expected to be induced in the blades from the current wind conditions. With a controller, the rotor blades are pitched to achieve the angle of attack using a pitch control system. The angle of attack is determined and the rotor blades are pitched from the initial blade orientation to the new angle of attack prior to vibrations being induced in the rotor blades.

10 Claims, 6 Drawing Sheets

(52) U.S. Cl.
CPC ............. *F03D 7/045* (2013.01); *F03D 17/00* (2016.05); *F03D 7/024* (2013.01); *F05B 2260/70* (2013.01); *F05B 2260/821* (2013.01); *F05B 2260/96* (2013.01); *F05B 2270/32* (2013.01); *F05B 2270/321* (2013.01); *F05B 2270/328* (2013.01); *F05B 2270/334* (2013.01)

(58) Field of Classification Search
CPC .... F03D 7/046; F03D 7/0298; F05B 2260/96; F05B 2260/80; F05B 2260/82; F05B 2260/821; F05B 2270/32; F05B 2270/321; F05B 2270/328; F05B 2270/334
See application file for complete search history.

(56) References Cited

U.S. PATENT DOCUMENTS

| | | |
|---|---|---|
| 2011/0076142 A1 | 3/2011 | Veldkamp et al. |
| 2020/0173418 A1 | 6/2020 | Arroyo Beltri et al. |
| 2023/0066258 A1* | 3/2023 | Hawkins ............... F03D 7/0296 |

* cited by examiner

SYSTEM AND METHOD FOR CONTROLLING BLADE PITCH ON WIND TURBINE ROTOR BLADES TO REDUCE VIBRATIONS AND LIMIT LOADS IN A LOCKED CONDITION OF THE TURBINE ROTOR

FIELD

The present disclosure relates in general to wind turbine power generating systems, and more particularly to systems and methods for damping vibrations and loads in wind turbines, particularly when the turbine rotor is locked, by controlling the blade pitch.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

There is a trend to make wind turbine blades increasingly longer to capture more wind and convert the energy of the wind into electricity. This results in the blades being more flexible and more prone to aero-elastic instabilities, e.g., vibrations of the blades. Vibrating blades create risk of major potential damages in the entire wind turbine.

When the wind turbine is in operation, a wind turbine controller may operate directly or indirectly any auxiliary drive system such as a pitch system or a yaw system to reduce loads on the blades. This way, vibrations of the blades may be counteracted. However, the problem of aero-elastic instabilities can be serious as well in circumstances when the wind turbine is in stand-still conditions, either idling or locked. Such oscillations include in particular edgewise oscillations.

At least two types of vibrations may happen during stand-still conditions. The first one is vortex induced vibration (VIV) when an angle of attack is around 90 degrees and vortices shed at frequencies close to blade eigen frequencies. The second one is stall induced vibration (SIV) when the angle of attack is close to stall angles (e.g., 15 degrees-20 degrees or other ranges depending on the wind turbine design) and the flow interaction may lead to blade vibrations. The angle of attack may be understood as a geometrical angle between a flow direction of the wind and the chord of a rotor blade.

The vortex and stall induced vibrations are phenomena that, if not adequately designed or compensated for, can lead to blade failure or accelerate blade damage.

When the rotor is locked against rotation, for instance due to installation, commissioning, or maintenance tasks, the blades can experience aero-elastic instabilities, such as the VIV and SIV vibrations. Blades are susceptible to these vibrations when angles of attack are within certain ranges (e.g., 25-45 degrees for SIV and 70-110 degrees for SIV for a certain blade and wind turbine design). Because the rotor is locked, rotation of the rotor cannot be used to reduce or damp these vibrations.

A current solution to the cited problems includes the use of aerodynamic devices attached to the blades to reduce vortices and/or increase damping. However, this solution increases costs and time for installation and removal.

Another solution provided in the published US Patent Application 2020/0173418 proposed a method for reducing vibrations in the rotor blades of a wind turbine when the wind turbine is in standstill or locked condition that entails using sensors to first measure one or more deformation parameters indicative or vibrations or oscillations (collectively referred to as vibrations herein) being induced in the blades. The method uses a dedicated controller in communication with the sensors to determine if vibrations exist based on the measured deformation parameters. The dedicated controller is also in communication with an auxiliary pitch drive system and generates an output signal to operate the auxiliary drive system to change blade pitch and reduce the vibrations. The method and system of the published '418 application rely, however, on actual detection of the vibration-induced parameters. In other words, the method and system are "reactive" to actual vibrations being induced in the blades, wherein such vibrations may result in damage to the blade or other wind turbine components before they can be damped.

In addition, excessive loads may be placed on the wind turbine components by changing the blade pitch of a locked rotor. For example, some pitch angles may be acceptable to damp the non-operational aero-elastic instabilities (e.g., SIV and VIV), but can result in unacceptable loads on certain wind turbine components.

The present disclosure provides examples of operational methods and systems for wind turbines that at least partially resolve some of the aforementioned disadvantages.

BRIEF DESCRIPTION

Aspects and advantages of the invention will be set forth in part in the following description, or may be obvious from the description, or may be learned through practice of the invention.

The present disclosure encompasses a proactive method for preventing or at least reducing SIV/VIV vibrations in one or more rotor blades of a wind turbine when the wind turbine is in a standstill condition with a rotor hub locked against rotation and the turbine is unable to yaw. The method includes determining an initial blade orientation of the blades to an incoming wind direction as well as one or more wind parameters for wind impacting the rotor blades. Based on these wind parameters and initial blade orientation, an angle of attack for the rotor blades is determined that will avoid SIV and VIV vibrations. With a controller (turbine controller or external controller) in communication with an auxiliary drive system, each rotor blade is pitched independently to a specific angle of attack that is not susceptible to SIV/VIV.

In a particular embodiment, the wind parameters and the angle of attack are determined at a time of, prior to, or after placing the rotor hub in a locked condition.

The wind parameters may include wind speed and wind direction, and the method may include determining that the wind speed is above a threshold level as a prerequisite to determining the angle of attack or prior to pitching the rotor blades to the angle of attack. After the wind speed is determined to be above the threshold level, the method may determine and use the wind direction to determine the angle of attack.

An embodiment of the method may include determining that yaw control is unavailable for the rotor hub as a prerequisite to determining the angle of attack or prior to pitching the rotor blades to the angle of attack.

In certain embodiments, the wind parameters considered for determining the angle of attack may further include one or both of wind veer and wind up-flow acting on the rotor blades.

The angle of attack for the determined wind parameters may be computed by the controller in real time. In another embodiment, the angles of attack for various wind parameter combinations are predefined (e.g., via modeling or empirically) and stored in electronic lookup tables, functions, or algorithms accessible by the controller.

Other method embodiments may further include determining load conditions that will be generated on one or more components of the wind turbine (such as the blade roots, tower, rotor hub locking device) with the rotor blades positioned to the angle of attack and, when the load is above a predetermined threshold level, determining an adjusted angle of attack that reduces the load to an acceptable level while still reducing the vibrations on the rotor blades.

The present disclosure also encompasses a wind turbine comprising rotor blades mounted on a rotatable rotor hub and one or more sensors located to detect wind parameters of wind impacting the rotor blades. The wind turbine includes a pitch system configured to change a pitch angle of the rotor blades. A controller is in operable communication with the pitch system and, when the rotor hub is locked against rotation and the turbine is unable to yaw, is configured to: determine values of the wind parameters for the wind impacting the rotor blades; determine an initial orientation of the rotor blades to an incoming wind direction; based on the wind parameters, determine an angle of attack for the rotor blades that at least reduces vibrations induced in the rotor blades from the wind; and control the pitch system to achieve the angle of attack; and wherein the angle of attack is determined and the rotor blades are pitched from a the initial blade orientation to the angle of attack prior to vibrations being induced in the rotor blades.

Other embodiments of the wind turbine may include configurations of the controller to achieve any combination of the functionalities discussed above with respect to the various method embodiments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
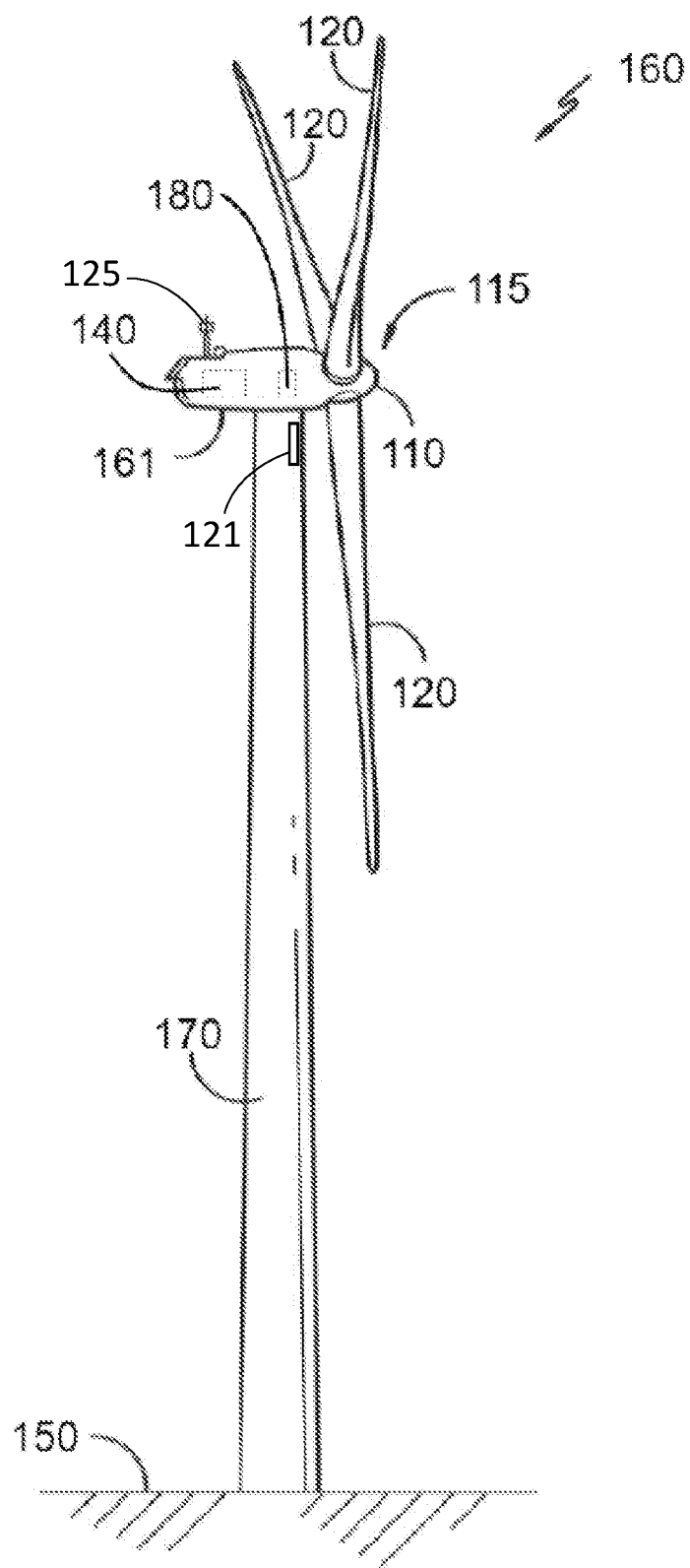
FIG. 1 illustrates a perspective view of a wind turbine according to one example.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "controller" refers not only to integrated circuits referred to in the art as being included in a computer, but also refers to a microcontroller, a microcomputer, a programmable logic controller (PLC), an application specific integrated circuit, and other programmable circuits. The controller is also configured to compute advanced control algorithms and communicate to a variety of Ethernet or serial-based protocols (Modbus, OPC, CAN, etc.). Additionally, a memory device(s) configured with the controller may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 402, configure the controller to perform the various functions as described herein.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated example, the rotor 115 includes three rotor blades 120. However, in an alternative embodiment, the rotor 115 may include more or less than three rotor blades 120. Each rotor blade 120 may be spaced from the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 or forming part of the nacelle for producing electrical energy.

The wind turbine 160 includes a wind turbine controller 180 that may be centrally located within the nacelle 161 or external to the nacelle. However, in other examples, the wind turbine controller 180 may be located within any other component of the wind turbine 160 or at a location outside the wind turbine. Further, the controller 180 may be communicatively coupled to any number of components of the wind turbine 160 in order to control the operation of such components.

For example, the controller 180 may be communicatively coupled to one or more auxiliary drive systems, such as a pitch system 107 for adjusting a blade pitch. Alternatively, the controller 180 drive system may comprise a yaw system 20 for rotating the nacelle 161 with the respect to the tower around a rotational axis.

The present disclosure relates to situations wherein the rotor 115 (and thus the rotor hub 110) is locked against rotation, for instance due to installation, commissioning, maintenance tasks, or any other reason. The present disclosure contemplates that the controller 180 remains communicatively coupled to at least the pitch system 107 in the locked state of the rotor 115.

However, the present disclosure also contemplates that the "controller" function may also be provided by a separate dedicated controller during the locked states of the rotor, as described in the published US Patent Application 2020/0173418 discussed above and incorporated herein in its entirety for all purposes. The dedicated controller may be configured to operate autonomously, i.e., independently from the wind turbine controller 180, at least in some operating conditions, and may be able, to perform tasks such as receiving and emitting signals and processing data when the wind turbine controller 180 is a standstill condition with the rotor 115 locked.

The wind turbine 160 of FIG. 1 may be placed in an offshore or onshore location.

The wind turbine controller (or "central control system") 180 may include one or more processor(s) and associated memory device(s) configured to perform a variety of computer-implemented functions (e.g., performing the methods, steps, calculations and the like and storing relevant data as disclosed herein). The wind turbine controller may perform various different functions, such as receiving, transmitting and/or executing wind turbine control signals and controlling the overall operation of the wind turbine. The wind turbine controller may be programmed to control the overall operation based on information received from sensors indicating e.g., loads, wind speed, wind direction, turbulence failure of a component, and others.

The wind turbine controller 180 may also include a communications module to facilitate communications between the controller 180 and the components of the wind turbine and their individual control systems (e.g., a controller for the pitch system 107, a controller for the yaw system 20, a converter control system, and other controls and components).

Further, the communications module may include a sensor interface (e.g., one or more analog-to-digital converters) to permit signals transmitted from one or more wind parameter sensors or load sensors to be converted into signals that can be understood and processed by the controller 180. It should be appreciated that the sensors may be communicatively coupled to the communications module using any suitable means as, for example, a wired connection or a wireless connection.

Figure 2:
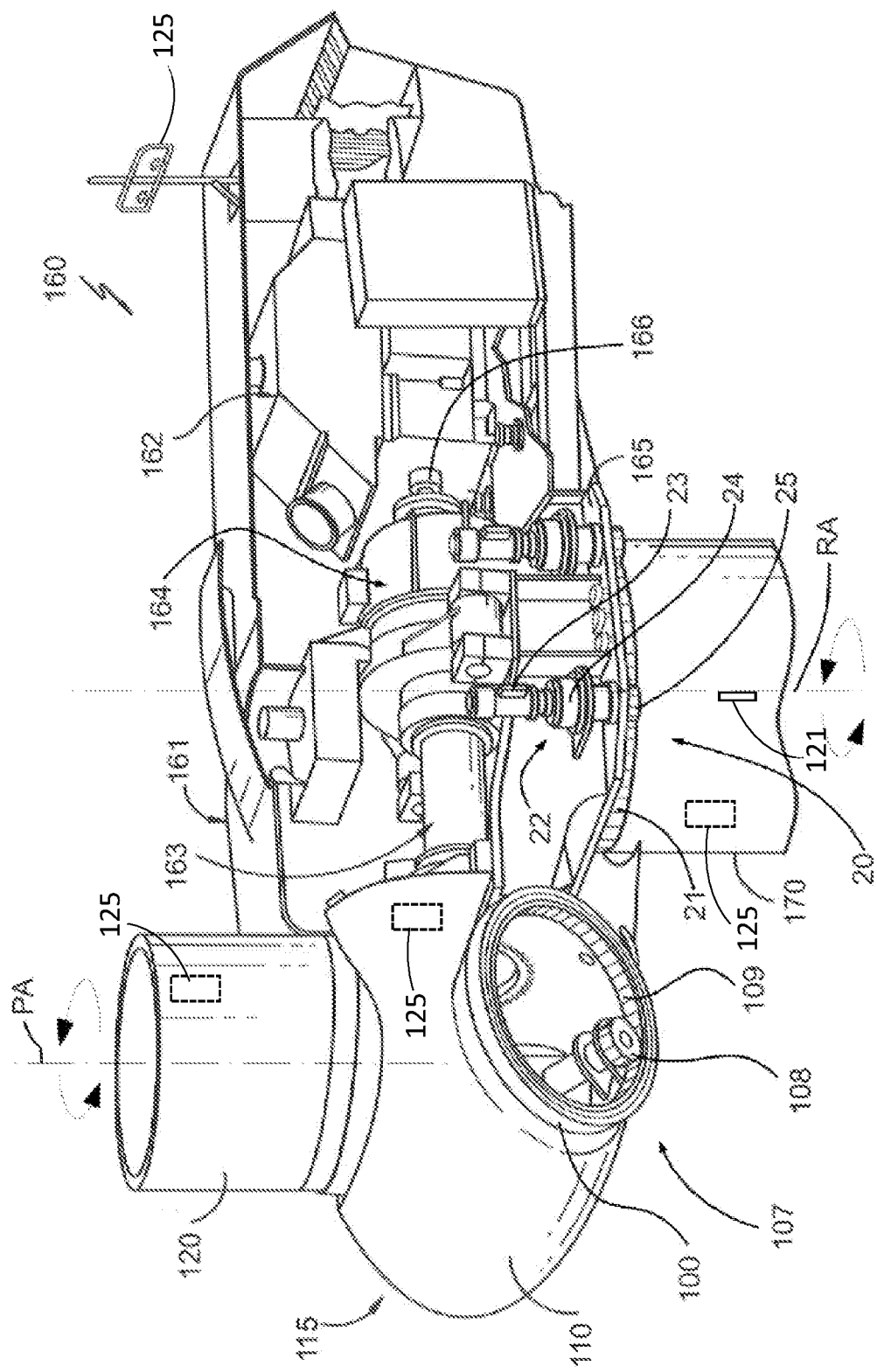
FIG. 2 illustrates a simplified, internal view of a nacelle of a wind turbine according to one example.

FIG. 2 illustrates a simplified, internal view of one example of the nacelle 161 of the wind turbine 160 of the FIG. 1. As shown, the generator 162 may be disposed within the nacelle 161 and coupled to the rotor 115 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a rotating axis or "yaw axis" RA as depicted in FIG. 2. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

The blades 120 are coupled to the hub 110 with a pitch control system 107 that includes a pitch bearing 100 between the blade 120 and the hub 110. The pitch bearing 100 comprises an inner ring and an outer ring (shown in FIG. 2). The wind turbine blade 120 may be attached either at the inner bearing ring or at the outer bearing ring, whereas the hub 110 is connected at the other bearing ring. A blade 120 may perform a relative rotational movement with respect to the hub 110 when the pitch control system 107 is actuated. The rotational movement is performed around a pitch axis PA and thus can be measured in degrees. The inner bearing ring may therefore perform a rotational movement with respect to the outer bearing ring. The pitch control system 107 of FIG. 2 comprises a drivable pinion 108 that meshes with an annular gear 109 provided on the inner bearing ring to set the wind turbine blade 120 into rotation.

Even though the pitch axis is shown for only a single blade 120, it should be clear that each of the blades 120 has such a pitch axis. A single pitch system or a plurality of individual pitch systems may be used to rotate the respective blades 120 around their longitudinal axes.

In the standstill state of the wind turbine 160 with the rotor 115 locked against rotation by, for example a locking pin, the wind turbine is not generating electrical power and is likely not receiving electrical power from a grid. In such instances, the wind turbine 160 further includes a dedicated power source 140 (FIG. 1), which may comprise a battery or a super-capacitor (not illustrated) that stores a predefined amount of energy to supply the controller 180 (or a dedicated controller) and the auxiliary drive system 20, 107 for a predefined period of time. In alternative examples, the dedicated power source 140 may comprise a fuel generator, such as a diesel generator.

As discussed in greater detail below, aspects of the present disclosure rely on detection of wind parameters acting on the blades 120, such as wind direction and speed. Referring to FIGS. 1 and 2, the wind turbine 10 may include one or more wind parameter sensors 125 for measuring various wind parameters upwind of the wind turbine 160. For example, as shown in FIG. 2, one sensor 125 may be located on the hub 110 so as to measure an actual wind parameter upwind from the wind turbine 160. The actual wind parameter may be any of the following: a wind gust, a wind speed, a wind direction, a wind acceleration, a wind turbulence, a wind shear, a wind veer, a wake, or similar. Further, the one or more sensors 125 may include at least one LIDAR sensor for measuring upwind parameters. For example, the sensor 125 in the hub 110 may be a LIDAR sensor, which is a measurement radar configured to scan an annular region around the wind turbine 160 and measure wind speed based upon reflection and/or scattering of light transmitted by the LIDAR sensor from aerosol. The cone angle (θ) and the range (R) of the LIDAR sensor may be suitably selected to provide a desired accuracy of measurement as well as an acceptable sensitivity.

In further embodiments as depicted in FIG. 2, the one or more LIDAR sensors may also be located on the wind turbine tower 170, on one or more of the wind turbine blades 120, on the nacelle 161, on a meteorological mast of the wind turbine, or at any other suitable location. In still further embodiments, the wind parameter sensor 125 may be located in any suitable location near the wind turbine 160. The sensors 125 may be configured to measure a wind parameter ahead of at least one specific portion, typically the most significant sections of the blades 120 in terms of contributions of those sections to aerodynamic torque on the blades 120. These sections may include, for example, sections close to the tip of the blade.

In alternative embodiments, the sensors 125 need not be LIDAR sensors and may be any other suitable sensors capable of measuring wind parameters upwind of the wind turbine 160. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein with respect to the sensors, the term "determine" and variations thereof indicates that the various sensors of the wind turbine may be configured to provide a direct measurement of the parameters being monitored or an indirect measurement of such parameters. Thus, the sensors 125 may, for example, be used to generate signals relating to the parameter being monitored, which can then be utilized by the controller 180 to determine the actual wind condition.

Figure 3:
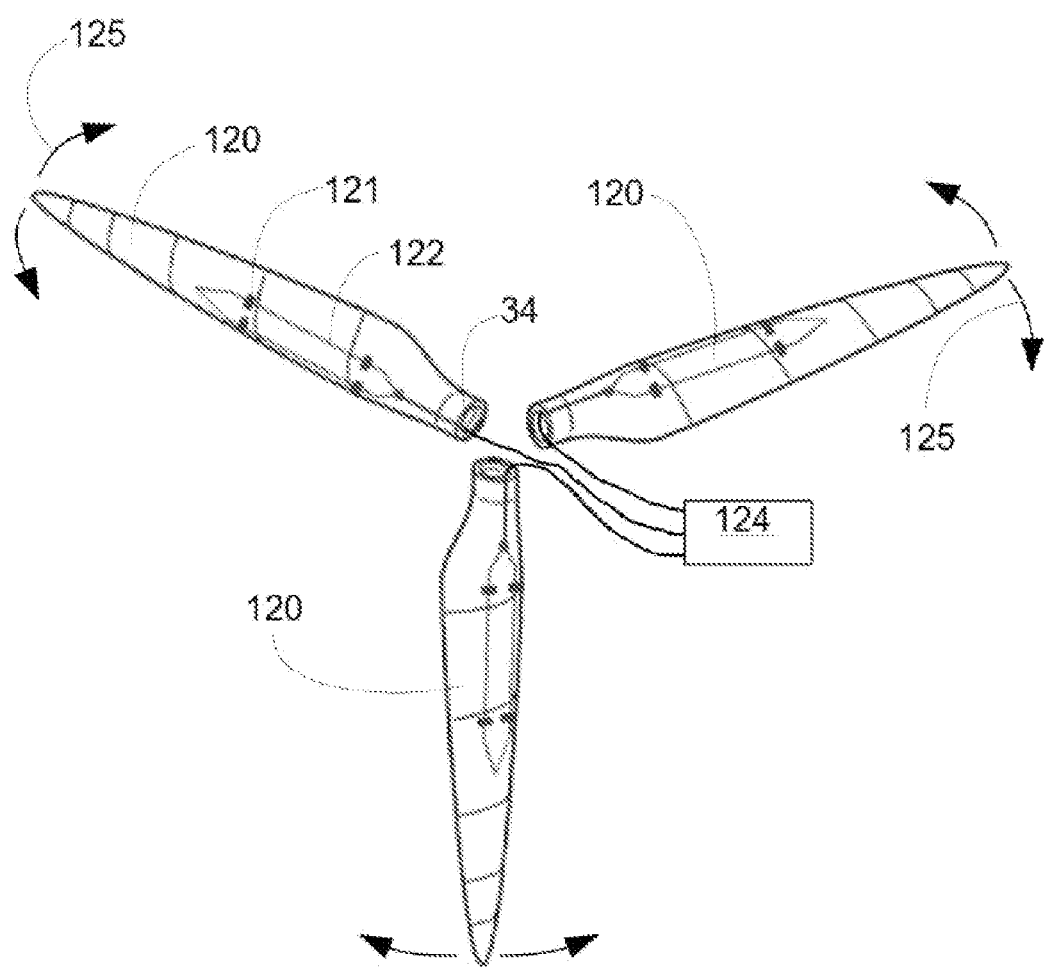
FIG. 3 illustrates blades of the wind turbine with strain sensors.

Other aspects of the present disclosure may rely on the determination of loads acting on certain components of the wind turbine 160. Referring to FIGS. 1 and 2, load sensors 121 may be utilized for measuring a deformation of one or more of the relevant components, such as the blades 120, tower 170, bed plate, as so forth. Such sensors may be strain sensors a deformation/strain parameter of the component. For example, FIG. 3 depicts an embodiment wherein strain sensors 121 are fiber optic strain gauges fixed at a structure of the blades 120 so as to measure strains at any portions of the blade, e.g., a blade root 34. Thus, loads on the blade may be calculated on the basis of the measured strains. The strain sensors 121 may be connected with each other through an optical path 122, e.g., optical fiber. The optical path 122 also allows the strain sensors 121 to be in communication with a sensor interrogation unit 124 or reading unit placed in the hub 110 or the nacelle 161. The sensor interrogation unit 124 is configured to feed the optical path 122 with emitted light pulses (not illustrated) and to receive light pulses from the strain sensors 121. The interrogation unit 124 is further configured to compare the emitted light pulses with received light pulses so as to determine deflections in blades 120. The number and location of strain sensors 121 in blades 120 (or other components) may vary depending on particular requirements.

The controller 180 may include or may be integral with the sensor interrogation unit 124. Alternatively, the sensor interrogation unit 124 may be separated from the controller 180 and in data communication with each other.

In some other examples, the strain sensors 121 may be provided with temperature sensors. Temperature data from temperature sensors may be taken into account by the unit 124 or even by the controller 180 because the temperature may affect operation and characteristics of strain sensors 121.

Alternatively, to the example of optical strain gauges, other types of sensors 121 capable of indicating a deformation of one or more of the blades 120 or other components may be used. Examples include accelerometers or displacement sensors in data communication with the controller 180.

In other embodiments, the loading conditions on various components of the wind turbine 160 may be indirectly determined. For example, the controller 180 (or other controller in communication with the controller 180) may receive operating data may consist of any or combination of the following: a pitch angle, a generator speed, a power output, a torque output, a temperature, a pressure, a tip speed ratio, an air density, or other similar operation condition. The controller then calculates an estimated load condition as a function of various combinations of the operating data. In one embodiment, for example, the controller may implement an estimator functionality with a control algorithm having a series of equations to determine the estimated load condition as a function of the pitch angle, the generator speed, the power output, and the air density. Further, the equations may be solved using the operating data and one or more aerodynamic performance maps. In one embodiment, the aerodynamic performance maps are dimensional or non-dimensional tables that describe rotor loading and performance (e.g., power, thrust, torque, or bending moment, or similar) under given conditions (e.g., density, wind speed, rotor speed, pitch angles, or similar). As such, the aerodynamic performance maps may include power coefficient, thrust coefficient, torque coefficient, and/or partial derivatives with respect to pitch angle, rotor speed, or tip speed ratio. Alternatively, the aerodynamic performance maps can be dimensional power, thrust, and/or torque values instead of coefficients.

Further, the control functionality may also include one or more electronic look-up tables (LUTs). In various embodiments, at least some of the LUTs may include: a wind turbine thrust, a blade loading, a tower loading, a shaft loading, a nacelle loading, a hub loading, or any other wind turbine loading condition for various combinations of wind parameters. As such, depending on the embodiment, the estimated load condition may be representative of wind parameters near the wind turbine or loading conditions of the wind turbine. As mentioned, the wind parameters may include a wind gust, a wind speed, a wind direction, a wind acceleration, a wind turbulence, a wind shear, a wind veer, a wake, or similar. Loading conditions may include a wind turbine thrust, a blade loading, a tower loading, a shaft loading, a nacelle loading, a hub loading, or similar.

Figure 4:
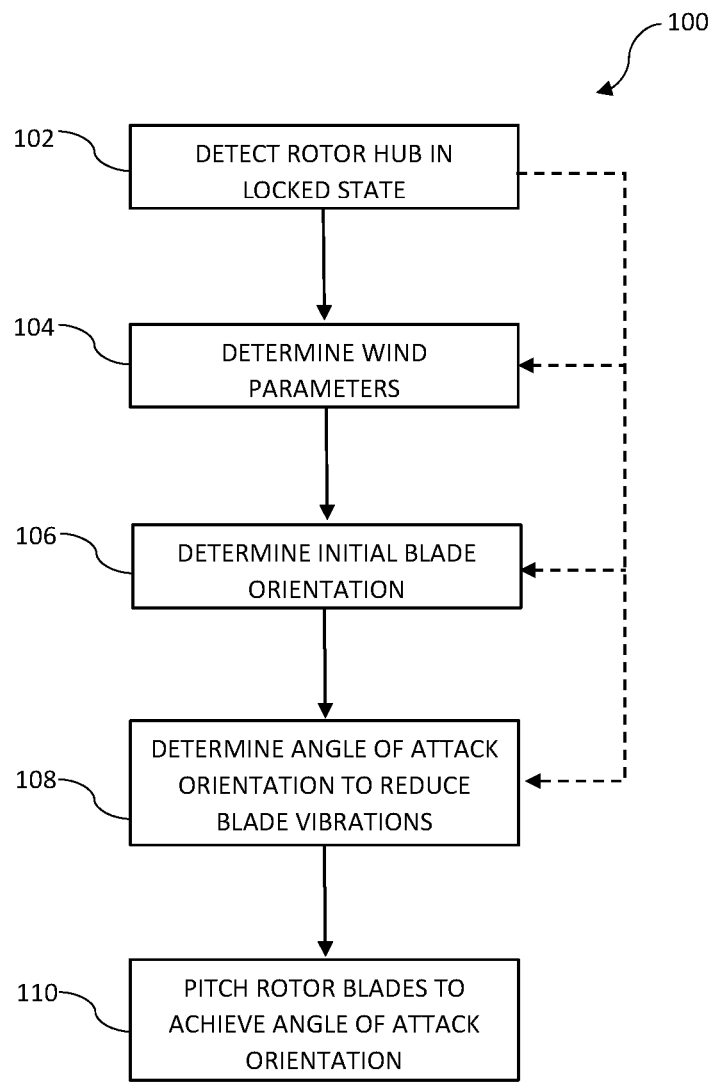
FIG. 4 shows a flowchart of a method for reducing vibrations and load in rotor blades of a wind turbine according to one example.

Referring to FIG. 4, an embodiment of a method 100 in accordance with aspects of the present invention is depicted in flowchart form. At step 102, the state of the rotor hub is detected by the controller via any suitable sensor or input signal. Specially, it is determined whether or not the rotor hub is locked against rotation. The dashed lines in FIG. 4 are meant to convey that the steps may be performed in sequence or concurrently.

At step 104, the wind parameters of interest are determined via the sensors 125 discussed above. These parameters may include, for example, any one or combination of wind direction, wind speed, wind veer, and wind up-flow. Wind veer is understood to mean wind direction variations with respect to vertical height. Wind up-flow is understood to mean an angle of the wind with respect to horizontal.

At step 106, and initial blade orientation of the rotor blades is determined based on a number of factors, such as the rotor position (e.g., determined by rotor position sensors), yaw position relative to wind direction, turbine geometry (e.g., shaft tilt, cone shape, blade pre-bend, blade twist, etc.) and pitch angle. It should be appreciated that, once the rotor is locked, other than pitch angle, the factors that are not dependent on a wind parameter do not change.

At step 108, an angle of attack for the blades is determined that will reduce or eliminate blade vibrations, as well as a pitch command/position that will place the blades in the desired angle of attack orientation. The angle of attack is generally referred to as the angle between the chord line of the blade and the relative wind vector. It should be appreciated that the angle of attack may vary along the span of the blade due to design twist in blades. For the present disclosure, the "angle of attack" is a position of the blade relative to incoming wind that is calculated to achieve the desired elimination or reduction of blade vibrations based on the initial blade orientation Once the desired angle of attack is computed based on the parameters identified above, a pitch command is generated by the controller to pitch the blade(s) to a pitch angle that most-closely achieves the angle of attack for the blade. The control system and methodology ensure that angles of attack along the entire span avoid the SIV/VIV angles of attack.

It should be understood that the angle of attack may vary for the individual blades based on their initial blade orientation and varying wind parameters at their different relative locked rotational position. Separate angles of attack are determined by the controller for each individual blade, and may be periodically updated or updated upon detection of changing wind parameters.

At step 110, the controller issues commands to the pitch control system to pitch the blades to the angular position that will most-closely achieve the desired angle of attack orientation for the blade.

Figure 5:
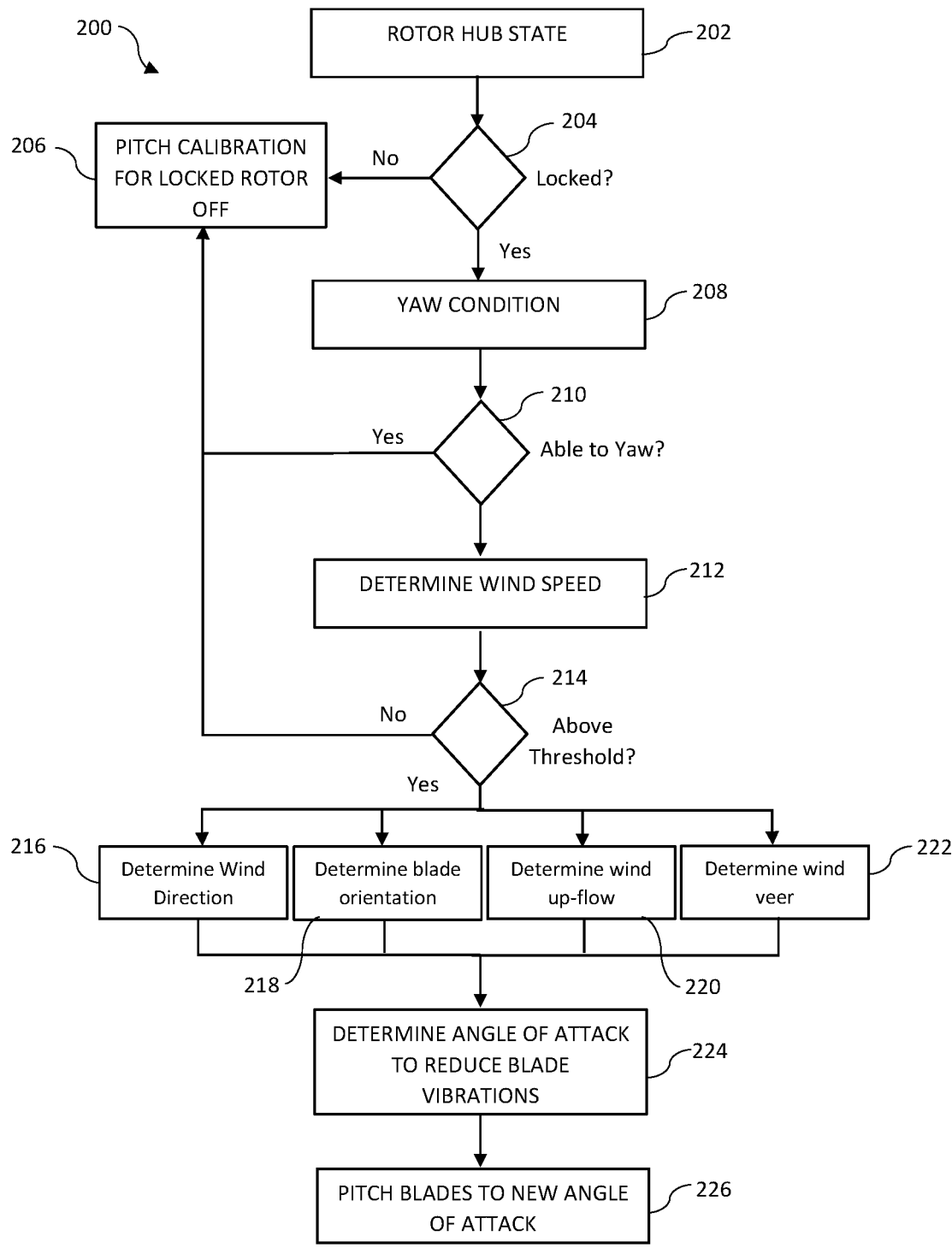
FIG. 5 shows a more detailed flowchart depicting various method embodiments.

FIG. 5 is a block diagram representing various other method embodiments. It should be appreciated that not all of the steps depicted in FIG. 5 are necessary for any one embodiment. Various combinations of the steps depicted in FIG. 5 are within the scope of the present disclosure.

Referring to FIG. 5, the method 200 includes step 202 wherein an initial state of the rotor hub is detected by the controller to determine if the rotor hub is locked against rotation.

At step 204, if the rotor hub is not locked, then the process proceeds directly to step 206 wherein the pitch control process is off (not activated). This condition may be present, for example, in a standstill state of the wind turbine wherein the rotor is allowed to idle and rotate.

At step 204, if it is determined by the controller that the rotor hub is locked, then the process proceeds to step 208 wherein the controller determines the yaw state of the rotor. If the rotor is able to yaw, then at step 210 the process diverts to step 206 and the pitch control process is not activated. This step may be desired when it is determined that the ability to yaw to the rotor hub provides sufficient capability to place the blades in a relative position with respect to the wind that prevents the blades from vibrating.

At step 200, if it is determined by the controller that the yaw system is non-operable, then the process proceeds to step 212 wherein the one or more wind speed parameter is determined by the controller via the wind parameter sensors discussed above.

At step 214, if it is determined by the controller that the wind speed is not above a threshold level that is defined such that blade oscillations are not a concern, then the process diverts to step 206 and the pitch control process is not activated.

At step 214, if it is determined by the controller that the wind speed is above the threshold value, then the process proceeds to one or more steps for determining other wind parameters desired for computing the angle of attack. For example, at step 216, the controller may determine wind speed. At step 218, the controller may determine an initial blade position and orientation relative to the incoming wind, as discussed above. At step 220, the controller may determine wind up-flow that may be impacting the blades. Likewise, at step 222, the controller may determine wind veer that may be impacting the blades.

At step 224, based on the the variables 216-222, the controller determines an angle attack for the blades that will reduce or prevent the blades from vibrating. This may be computed on a real time basis via an algorithm implemented by the controller. Alternatively, an electronic look-up table may be pre-generated and stored in a memory that is accessible by the controller. This look-up may contain pre-defined angle of attack values (positions) for the combination of variables discussed above. These pre-defined values may be the result of modeling or may have been empirically determined.

Step 224 also includes the controller determining a blade pitch position for the blades that will present the blade to the wind at the desired angle of attack orientation.

At step 226, the controller issues a command signal to the pitch control system and the blades are pitched to the determined pitch position. As discussed above, this pitch position may be different for each blade depending on the blades rotational position, height, varying wind parameters at each blade, etc., and the steps 212, 226 may be performed for each individual blade.

Figure 6:
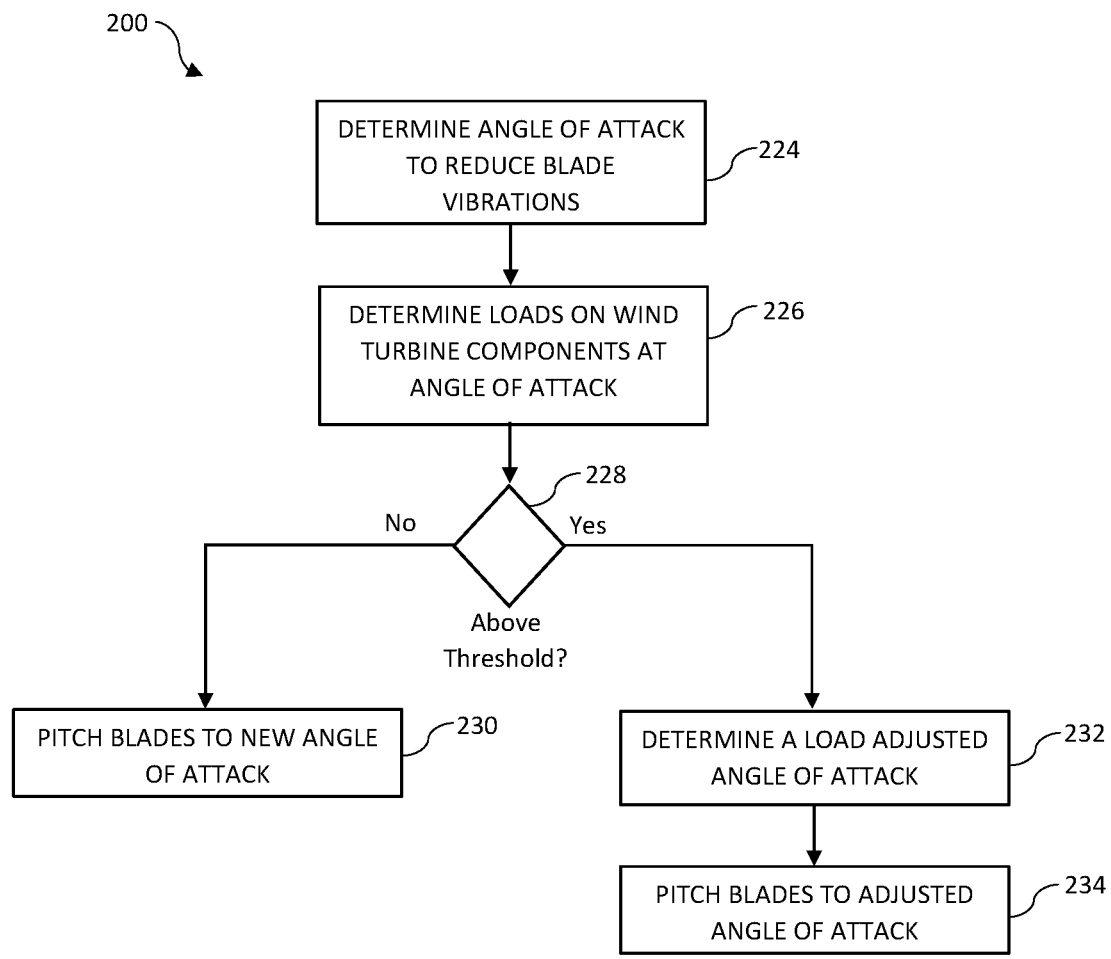
FIG. 6 shows a flowchart depicting an alternative method embodiment.

FIG. 6 depicts an embodiment of the method 200 with steps for consideration of the loads induced on one or more of the wind turbine components at the determined new angle of attack orientation. Step 224 is discussed above with respect to FIG. 5.

At step 226, the controller determines load expected to be induced one or more of the wind turbine components at the new angle of attack, such as the blade roots, tower, rotor hub locking device, or any other component that experiences wind-induced loads. This determination may be made, for example, by the controller referencing a stored electronic look-up table that provides pre-defined load values for the blades at various angles of attack for various wind parameters. This information may be generated via modeling or empirical determination.

At step 228, if the expected load(s) is below a threshold value, then the blades are pitched to the angular position determined at step 224 without considerations to the expected load.

At step 228, if the expected load(s) are above the threshold value, then the process proceeds to step 232 wherein a load-adjusted angle of attack is determined to reduce the load. This load-adjusted angle of attack is an optimized value that reduces the load to an acceptable level (which may be above or below the threshold value) while still reducing the vibrations induced in the blades. At step 234, the blades are pitched to the adjusted angle of attack.

It should be appreciated that the various methods described herein are proactive in nature in that they rely on wind parameter information, blade geometry, and blade position to essentially predict or estimate if blade vibrations will be induced in the blades for a given set of variables. Action is taken to re-orient the blades to a new angle of attack that will reduce or eliminate the vibrations before they occur.

The present disclosure also encompasses a wind turbine 160 having rotor blades 120 mounted on a rotatable hub 110, as well as one or sensors 125 located to detect wind parameters of wind impacting the rotor blades 120, as discussed above. The wind turbine may also include strain sensors 121 located on components that are prone to wind-induced loads. The wind turbine 160 includes a pitch control system 107 configured to change a pitch angle of the rotor blades. A controller 180 is in operable communication with the pitch system. The controller 180 is configured to carry out the various method embodiments described above to pitch the blades to a position that presents a new angle of attack orientation of the blade to the existing wind conditions to reduce or eliminate vibrations in the blades.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1: A proactive method for reducing vibrations in one or more rotor blades of a wind turbine when the wind turbine is in a standstill condition with a rotor hub locked against rotation, the method comprising: determining one or more wind parameters for wind impacting the rotor blades; determining an initial blade orientation of the rotor blades to an incoming wind direction; based on the wind parameters and initial blade orientation, determining an angle of attack for the rotor blades that will at least reduce vibrations expected to be induced in the rotor blades from the wind; with a controller, pitching the rotor blades to achieve the angle of attack using an auxiliary drive system in the wind turbine; and wherein the angle of attack is determined and the rotor blades are pitched from the initial blade orientation to the angle of attack prior to vibrations being induced in the rotor blades.

Clause 2: The proactive method according to clause 1, wherein the wind parameters and the angle of attack are determined at a time of or prior to placing the rotor hub in a locked condition.

Clause 3. The proactive method according to any preceding clause, further comprising determining that yaw control is unavailable for the rotor hub prior to determining the angle of attack or prior to pitching the rotor blades to the angle of attack.

Clause 4. The proactive method according to any preceding clause, wherein the wind parameters comprise wind speed and wind direction, and further comprising determining that the wind speed is above a threshold level as a prerequisite to determining the angle of attack or prior to pitching the rotor blades to the angle of attack, and after the wind speed is determined to above the threshold level, further comprising determining the wind direction and using wind direction to determine the angle of attack.

Clause 5. The proactive method according to any preceding clause, wherein the wind parameters considered for determining the angle of attack further comprise one or both of wind veer and wind up-flow acting on the rotor blades.

Clause 6. The proactive method according to any preceding clause, wherein the angle of attack for the determined wind parameters are predefined and stored in lookup tables, functions, or algorithms accessible by the controller.

Clause 7. The proactive method according to any preceding clause, further comprising determining load that will be generated on one or more components of the wind turbine with the rotor blades positioned to the angle of attack, and when the load is above a predetermined threshold level, determining an adjusted angle of attack that reduces the load to an acceptable level while still reducing the vibrations on the rotor blades.

Clause 8. A proactive method for reducing vibrations in one or more rotor blades of a wind turbine when the wind turbine is in a standstill condition with a rotor hub locked against rotation, the method comprising: determining one or more wind parameters for wind impacting the rotor blades; determining an initial blade orientation of the rotor blades to an incoming wind direction; based on the wind parameters and initial blade orientation, determining an angle of attack for the rotor blades that will at least reduce vibrations induced in the rotor blades from the wind; determining load that will be generated on one or more components of the wind turbine with the rotor blades positioned to the angle of attack, and when the load is above a predetermined threshold level, determining an adjusted angle of attack that reduces the load to an acceptable level while still reducing the vibrations on the rotor blades; with a controller, pitching the rotor blades to the angle of attack or adjusted angle of attack using an auxiliary drive system in the wind turbine; and wherein the angle of attack or adjusted angle of attack are determined by the controller and the rotor blades are pitched from the initial blade orientation to the angle of attack or adjusted angle of attack prior to vibrations being induced in the rotor blades.

Clause 9: The proactive method according to clause 8, wherein the wind parameters and the angle of attack or adjusted angle of attack are determined at a time of, prior to, or after placing the rotor hub in a locked condition.

Clause 10: The proactive method according to clause 8 or clause 9, wherein the wind parameters comprise wind speed and wind direction, and further comprising determining that the wind speed is above a threshold level as a prerequisite to determining the angle of attack or adjusted angle of attack, or prior to pitching the rotor blades to the angle of attack or adjusted angle of attack, and after the wind speed is determined to be above the threshold level, further comprising determining the wind direction and using the determined wind direction to determine the angle of attack or adjusted angle of attack.

Clause 11: The proactive method according to any one of clauses 8-10, wherein the wind parameters considered for determining the angle of attack or adjusted angle of attack further comprise one or both of wind veer and wind up-flow acting on the rotor blades.

Clause 12: The proactive method according to any one of clauses 8-11, further comprising determining that yaw control is unavailable for the rotor hub prior to determining the angle of attack or prior to pitching the rotor blades to the angle of attack.

Clause 13: The proactive method according to any one of clauses 8-12, wherein the angle of attack or adjusted angle of attack for the determined wind parameters are predefined and stored in lookup tables accessible by the controller.

Clause 14: A wind turbine, comprising: rotor blades on a rotatable rotor hub; one or more sensors located to detect wind parameters of wind impacting the rotor blades; a pitch system configured to change a pitch angle of the rotor blades; a controller in operable communication with the pitch system; wherein with the rotor hub locked against rotation, the controller is configured to: determine values of the wind parameters for the wind impacting the rotor blades; determine an initial blade orientation of the rotor blades to an incoming wind direction; based on the wind parameters and initial blade orientation, determine an angle of attack for the rotor blades that will at least reduce vibrations induced in the rotor blades from the wind; control the pitch system to pitch the rotor blades to the angle of attack; and wherein the angle of attack is determined and the rotor blades are pitched from the initial blade orientation to the angle of attack prior to vibrations being induced in the rotor blades.

Clause 15: The wind turbine according to clause 14, wherein the wind parameters and the angle of attack are determined by the controller at a time of or prior to placing the rotor hub in a locked condition.

Clause 16: The wind turbine according to any preceding clause, wherein the wind parameters comprise wind speed and wind direction, the controller further configured to determine that the wind speed is above a threshold level as a prerequisite to determining the angle of attack or prior to pitching the rotor blades to the angle of attack.

Clause 17: The wind turbine according to any preceding clause, wherein the controller is further configured to factor the additional wind parameters of wind veer and wind up-flow into the determination of the angle of attack.

Clause 18: The wind turbine according to any preceding clause, wherein the angle of attack for the determined wind parameters are predefined and stored in a memory as lookup tables accessible by the controller.

Clause 19: The wind turbine according to any preceding clause, wherein the controller is further configured to determine that yaw control is unavailable for the rotor hub prior to determining the angle of attack or prior to pitching the rotor blades to the angle of attack.

Clause 20: The wind turbine according to any preceding clause, wherein the controller is further configured to determine load that will be generated on one or more components of the wind turbine with the rotor blades positioned to the angle of attack, and when the load is above a predetermined threshold level, determine an adjusted angle of attack that reduces the load to an acceptable level while still reducing the vibrations on the rotor blades.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A proactive method for reducing vibrations in one or more rotor blades of a wind turbine when the wind turbine is in a standstill condition with a rotor hub locked against rotation, the method comprising:

determining one or more wind parameters for wind impacting the rotor blades;

determining an initial blade orientation of the rotor blades to an incoming wind direction;

based on the one or more wind parameters and the initial blade orientation, determining an angle of attack for the rotor blades that will at least reduce vibrations induced in the rotor blades from the wind;

with a controller, pitching the rotor blades to achieve the angle of attack using an auxiliary drive system in the wind turbine;

wherein the angle of attack is determined and the rotor blades are pitched from the initial blade orientation to the angle of attack prior to vibrations being induced in the rotor blades; and determining that yaw control is unavailable for the rotor hub prior to determining the angle of attack or prior to pitching the rotor blades to the angle of attack; and wherein the one or more wind parameters comprise wind speed and wind direction, and further comprising determining that the wind speed is above a threshold level as a prerequisite to determining the angle of attack or prior to pitching the rotor blades to the angle of attack, and after the wind speed is determined to be above the threshold level, further comprising determining the wind direction and using the wind direction to determine the angle of attack.

2. The proactive method according to claim 1, wherein the one or more wind parameters and the angle of attack are determined at a time of, prior to, or after the rotor hub is locked against rotation.

3. The proactive method according to claim 1, wherein the one or more wind parameters considered for determining the angle of attack further comprise one or both of wind veer and wind up-flow acting on the rotor blades.

4. The proactive method according to claim 1, wherein the angle of attack for the determined one or more wind parameters is predefined and stored in lookup tables, functions, or algorithms accessible by the controller.

5. The proactive method according to claim 1, further comprising determining load that will be generated on one or more components of the wind turbine with the rotor blades positioned to the angle of attack, and when the load is above a predetermined threshold level, determining an adjusted angle of attack that reduces the load to an acceptable level.

6. A wind turbine, comprising:

rotor blades on a rotatable rotor hub;

one or more sensors located to detect wind parameters of wind impacting the rotor blades;

a pitch system configured to change a pitch angle of the rotor blades;

a controller in operable communication with the pitch system;

wherein with the rotor hub locked against rotation, the controller is configured to:

determine values of the wind parameters for the wind impacting the rotor blades;

determine an initial blade orientation to an incoming wind direction;

based on the wind parameters, determine an angle of attack for the rotor blades that will at least reduce vibrations induced in the rotor blades from the wind;

control the pitch system to pitch the rotor blades to the angle of attack;

determine that yaw control is unavailable for the rotor hub prior to determining the angle of attack or prior to pitching the rotor blades to the angle of attack;

wherein the angle of attack is determined and the rotor blades are pitched from the initial blade orientation to the angle of attack prior to vibrations being induced in the rotor blades; and wherein the one or more wind parameters comprise wind speed and wind direction, the controller further configured to determine that the wind speed is above a threshold level as a prerequisite to determining the angle of attack or prior to pitching the rotor blades to the angle of attack, and after the wind speed is determined to be above the threshold level, to determine the wind direction and use the wind direction to determine the angle of attack.

7. The wind turbine according to claim 6, wherein the wind parameters and the angle of attack are determined by the controller at a time of or prior to the rotor hub being locked against rotation.

8. The wind turbine according to claim 6, wherein the controller is further configured to factor the additional wind parameters of wind veer and wind up-flow into the determination of the angle of attack.

9. The wind turbine according to claim 6, wherein the angle of attack for the determined wind parameters is predefined and stored in a memory as lookup tables accessible by the controller.

10. The wind turbine according to claim 6, wherein the controller is further configured to determine load that will be generated on one or more components of the wind turbine with the rotor blades positioned to the angle of attack, and when the load is above a predetermined threshold level, determine an adjusted angle of attack that reduces the load to an acceptable level.

\* \* \* \* \*